US009690737B2

(12) United States Patent
Tucek

(10) Patent No.: US 9,690,737 B2
(45) Date of Patent: Jun. 27, 2017

(54) SYSTEMS AND METHODS FOR CONTROLLING ACCESS TO A SHARED DATA STRUCTURE WITH READER-WRITER LOCKS USING MULTIPLE SUB-LOCKS

(75) Inventor: Joseph A. Tucek, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 342 days.

(21) Appl. No.: 14/417,233

(22) PCT Filed: Jul. 31, 2012

(86) PCT No.: PCT/US2012/049080
§ 371 (c)(1),
(2), (4) Date: Jan. 26, 2015

(87) PCT Pub. No.: WO2014/021879
PCT Pub. Date: Feb. 6, 2014

(65) Prior Publication Data
US 2015/0248367 A1 Sep. 3, 2015

(51) Int. Cl.
G06F 13/40 (2006.01)
G06F 9/52 (2006.01)
(Continued)

(52) U.S. Cl.
CPC .......... *G06F 13/4027* (2013.01); *G06F 9/526* (2013.01); *G06F 12/0831* (2013.01);
(Continued)

(58) Field of Classification Search
CPC .......... G06F 13/40; G06F 12/08; G06F 17/30; G06F 9/52
See application file for complete search history.

(56) References Cited

U.S. PATENT DOCUMENTS 5,535,365 A  7/1996 Barriuso et al.
6,356,983 B1 3/2002 Parks
(Continued)

FOREIGN PATENT DOCUMENTS

CN 101061462 A 10/2007

OTHER PUBLICATIONS

Anderson et al., "Buttress: A Toolkit for Flexible and High Fidelity I/O Benchmarking," Proc of the 3rd Conf on File and Storage Technologies (FAST'04) ( 2004), 14 pgs.
(Continued)

Primary Examiner — Henry Tsai
Assistant Examiner — Christopher A Daley
(74) Attorney, Agent, or Firm — Conley Rose, P.C.

(57) ABSTRACT

A computer system for controlling access to a shared data structure includes a shared memory coupled to first and second processing units that stores a multi-lock to control access to a shared data structure. The multi-lock includes a first sub-lock associated with the first processing unit and a second sub-lock associated with the second processing unit The system also includes a data access control engine to receive a request to read from the data structure from the first processing unit and, as a result, determine whether a privately modifiable copy the first sub-lock exists in a first cache dedicated to the first processing unit, acquire a read portion of the first sub-lock and not communicate the acquisition across a coherence bus if a privately modifiable copy of the first sub-lock exists in the first cache, and if a privately modifiable copy of the first sub-lock does not exist in the first cache, load the first sub-lock into the first cache if no copy is in the first cache, shootdown other copies of the first sub-lock, and acquire the read portion of the first sub-lock.

15 Claims, 12 Drawing Sheets

(51) Int. Cl.
*G06F 12/08* (2016.01)
*G06F 17/30* (2006.01)
*G06F 12/0831* (2016.01)

(52) U.S. Cl.
CPC .. *G06F 17/30132* (2013.01); *G06F 17/30171* (2013.01); *G06F 2209/523* (2013.01); *G06F 2212/621* (2013.01)

(56) References Cited

U.S. PATENT DOCUMENTS

| | | | |
|---|---|---|---|
| 6,601,120 B1 | 7/2003 | Schimmel | |
| 6,785,888 B1* | 8/2004 | McKenney | G06F 9/5016 709/226 |
| 7,797,704 B2 | 9/2010 | Anderson | |
| 7,934,062 B2 | 4/2011 | McKenney et al. | |
| 8,103,838 B2 | 1/2012 | Dice et al. | |
| 8,966,491 B2* | 2/2015 | Calciu | G06F 9/526 707/704 |
| 9,218,307 B2* | 12/2015 | McKenney | G06F 9/52 |
| 2001/0052054 A1 | 12/2001 | Franke et al. | |
| 2003/0126381 A1 | 7/2003 | Vo | |
| 2004/0093469 A1* | 5/2004 | Glasco | G06F 12/0815 711/145 |
| 2005/0177831 A1* | 8/2005 | Goodman | G06F 9/3004 718/100 |
| 2006/0136677 A1 | 6/2006 | Fuhs | |
| 2008/0320262 A1 | 12/2008 | McKenney et al. | |
| 2010/0042786 A1* | 2/2010 | Bell | G06F 12/0831 711/121 |
| 2010/0235586 A1* | 9/2010 | Gonion | G06F 12/0831 711/144 |
| 2010/0275209 A1 | 10/2010 | Detlefs | |
| 2010/0332766 A1* | 12/2010 | Zeffer | G06F 9/526 711/144 |
| 2010/0332770 A1 | 12/2010 | Dice et al. | |
| 2012/0144372 A1* | 6/2012 | Ceze | G06F 8/314 717/124 |
| 2012/0198163 A1* | 8/2012 | Damodaran | H03K 19/0016 711/122 |
| 2012/0233411 A1* | 9/2012 | Pohlack | G06F 12/0815 711/147 |
| 2012/0272007 A1* | 10/2012 | Moyer | G06F 11/1658 711/128 |
| 2014/0040567 A1* | 2/2014 | Pohlack | G06F 12/1027 711/152 |

OTHER PUBLICATIONS

Boyd-Wickizer et al., "An Analysis of Linux Scalability to Many Cores,", Proc of the 9th USENIX Conf on Operating Systems and Design Implementation, 19 pgs,—2010.

Gamsa et al., "Performance Issues for Multiprocessor Operating Systems," Technical Report CSRI-339, Nov. 1995, 16 p.

Lev et al., "Scalable Reader-Writer Locks," SPAA '09, Aug. 11-13, 2009, Copyright 2009 Sun Microsystems, Inc., 10 p.

PCT Search Report/Written Opinion—Application No. PCT/US2012/049080 dated Feb. 20, 2013—9 pages.

* cited by examiner a) PHYSICAL CONTENT OF CACHES

L1-1

| TAG | CONTENTS | STATE |
|---|---|---|
| 100 | PUPPIES | E |
| 10 | 0, N | S |
| 900 |  | I |
| 990 |  | I |
| 110 | KITTENS | M |

↑ 164

L1-2

| TAG | CONTENTS | STATE |
|---|---|---|
| 100 |  | I |
| 10 | 0, N | S |
| 20 |  | I |
| 660 | 42 | M |
| 670 | 73 | S |

↑ 166

L1-3

| TAG | CONTENTS | STATE |
|---|---|---|
| 400 | 3.14159 | S |
| 70 |  | I |
| 60 |  | I |
| 30 | 0, N | E |
| 150 |  | I |

↑ 168

L1-4

| TAG | CONTENTS | STATE |
|---|---|---|
| 400 | 3.14159 | S |
| 0 | 0 | S |
| 800 | STUFF | E |
| 660 |  | I |
| 40 | 0, N | M |

↑ 170 b) LOGICAL CONTENT OF LOCK

| #R | W? |
|---|---|
| 10 | 0 | N |
| 20 | 0 | N |
| 30 | 0 | N |
| 40 | 0 | N |

SYSTEMS AND METHODS FOR CONTROLLING ACCESS TO A SHARED DATA STRUCTURE WITH READER-WRITER LOCKS USING MULTIPLE SUB-LOCKS

BACKGROUND

Modern computers achieve increased performance through the use of multiple processor dies and, in some cases, multiple processor cores on a single die. In order to take advantage of these improved hardware arrangements, software is created to run multiple threads simultaneously on a single processor core.

BRIEF DESCRIPTION OF THE DRAWINGS

For a detailed description of example implementations of the invention, reference will now be made to the accompanying drawings in which:

FIGS. 2a-2i show exemplary memory diagram is in accordance with various examples of the present disclosure;

NOTATION AND NOMENCLATURE

Figure 1A:
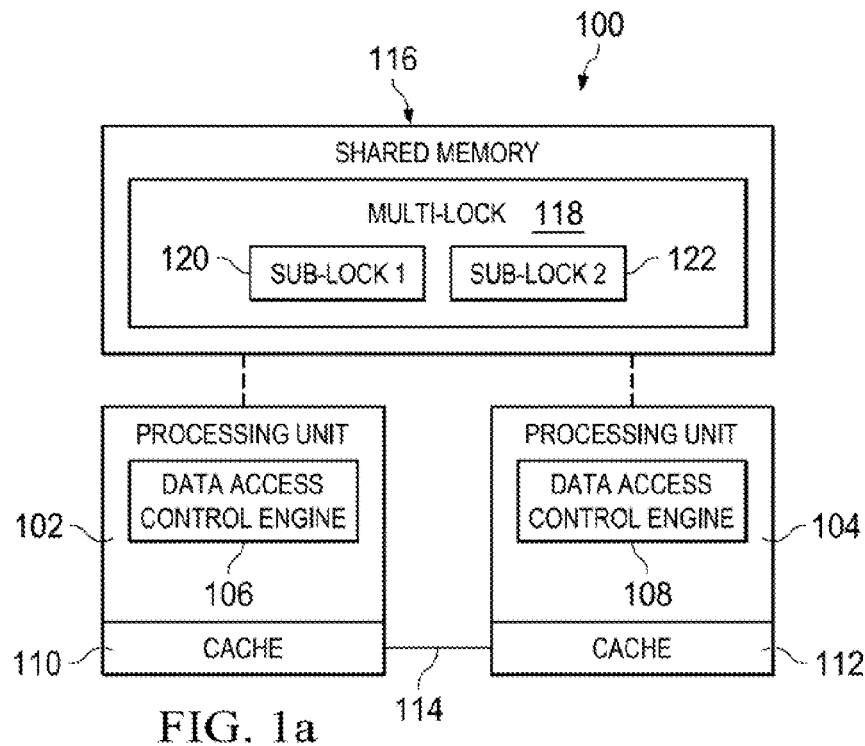
FIGS. 1a and b show alternate block diagrams of a system for controlling access to a shared data structure in accordance with various examples of the present disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

As used herein, the term "processing unit" refers to either a physical or a logical resource that performs a computation task. Examples of logical resources include threads and processes. Examples of physical resources include a virtual CPU core, a physical CPU core, grouped CPU cores sharing one or more cache levels. CPU cores on a common die, CPU cores on a common multi-chip module, CPU cores on a common socket, linked CPU cores, and CPU cores in a common chassis.

As used herein, the term "lock" when used as a noun refers to a mechanism to provide control to concurrent accesses to data, in particular a data structure.

As used herein, the term "lock" when used as a verb refers to the action in which a processing unit informs other processing units that it has exclusive access to the data associated with a lock. This may also be referred to as "acquiring" a lock.

As used herein, the term "MESI" or "MESI protocol" refers to a commonly-used family of cache coherency protocols, in which cache lines are marked as modified, exclusive, shared, or invalid.

As used herein, the term "shootdown" refers to notifying other cache units that the copy of a cache line that they hold can no longer be considered up-to-date, and that if they wish to satisfy accesses to said line they must update themselves first. For example, in the MESI protocol, shootdown includes the "broadcast invalid" and "read with intent to modify" messages.

DETAILED DESCRIPTION

The following discussion is directed to various examples of the invention. Although one or more of these examples may be preferred, the examples disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Multiple threads may operate on (e.g., read from and write to) shared data structures. In such situations, the threads should coordinate with one another so that more than one thread does not try to write to the data structure at the same time. A lock is a synchronization mechanism to restrict access to a shared data structure, which enables processing units (e.g., threads, processes, hardware SMT contexts, CMP cores, CPUs) to coordinate with one another to avoid a situation where more than one processing unit attempts to write to the data structure at the same time. In a simple form, the lock may have both a read portion and a write portion. The write portion signifies whether another processing unit is writing to the data structure associated with the lock, and could be binary (e.g., the low bit of the lock denotes that either a processing unit is writing to the data structure or no processing unit is writing to the data structure). The read portion may take the form of a counter, which is incremented when a processing unit requests to read the data structure and is decremented when a processing unit stops reading the data structure. In this example, multiple processing units may read the data structure at once.

In many cases, a processing unit mainly reads from the data structure; however, the processing unit performs a write (i.e., to increment the value of the read portion of the lock) to acquire the read portion of the lock. For example, when the processing unit acquires (e.g., increments) the read portion of the lock, this is typically communicated to other processing units because one of the other processing units may desire to perform a write, which cannot occur until the read portion of the lock is released (e.g., the counter value is zero). In other words, acquiring the read portion of a lock forces a write to other processing units to maintain coherency. This communication, which may be from one processing core to another, is referred to as "coherence traffic." Coherence traffic may result in a performance bottleneck, even in the case where processing units are mostly reading from a shared data structure. As a result, the difference in performance may be large when a data structure is guaranteed to be read only, which does not require a lock, compared to when a data structure is written to in even a small fraction of the time, which requires a lock mechanism where both reading from and writing to the data structure generates coherence traffic.

As explained above, in many cases, read operations outnumber write operations by an order of magnitude or more. Thus, gaining performance during read operations (e.g., reducing coherence traffic in the event a processing unit reads from a shared data structure) is beneficial. In accordance with various examples of the present disclosure, a "multi-lock" is defined for a data structure. A multi-lock includes a sub-lock for each processing unit. Similar to the locks explained above, the sub-locks each have a read portion and a write portion. In one implementation, a sub-lock could be a "pthread rwlock t" (e.g., as per the Portable Operating System Interface (POSIX) specification) or other similar mechanism (e.g., SRW locks in Windows). However, when a processing unit acquires the read portion of a sub-lock, it does so only on its own sub-lock and this is not necessarily communicated to other processing units. Additionally, when a processing unit desires to write to a shared data structure, the processing unit acquires the write portion of all of the sub-locks included in the multi-lock for that data structure. Thus, the processing unit checks each sub-lock to ensure that there are no readers (e.g., the processing unit checks that the read portion of each sub-lock is zero, indicating that there are no readers).

As will be explained in further detail below, acquiring the write portion of each sub-lock in a multi-lock results in coherence traffic because the processing unit that acquires the write portions is required to communicate its acquisition to the other processing units so that they may invalidate their copies of their sub-locks. In some cases, for example when a processing unit acquires a write lock, releases it, and acquires the write lock again before any other processing unit attempts to acquire that lock (read or write), the re-acquisition of the write lock may not be communicated to other processing units. However, in either event, no coherence traffic is generated where a processing unit acquires the read portion of its sub-lock. In many cases, read operations greatly outnumber write operations and thus a performance benefit is realized by reducing coherence traffic during read operations.

Turning now to FIG. 1a, a system 100 is shown in accordance with various examples of the present disclosure. The system 100 includes a first processing unit 102 and a second processing unit 104. Each processing unit 102, 104 includes a respective data access control engine 106, 108 and a respective dedicated cache 110, 112. The caches 110, 112 are coupled by way of a coherence bus 114, which may be a point-to-point coherence link such as, for example, HyperTransport (HT) or QuickPath Interconnect (QPI). The coherence bus 114 enables coherence traffic between the caches 110, 112, for example to implement a cache coherence scheme, such as the MESI protocol. Coherence information or traffic transmitted on the coherence bus 114 may include, for example, MESI state information or information relevant to implement another cache coherence protocol. Each processing unit 102, 104 is also coupled to a shared memory 116, which includes a stored multi-lock 118 associated with a data structure that is shared by the processing units 102, 104. The multi-lock 118 includes a first sub-lock 120 associated with the first processing unit 102 and a second sub-lock 122 associated with the second processing unit 104.

Figure 1B:
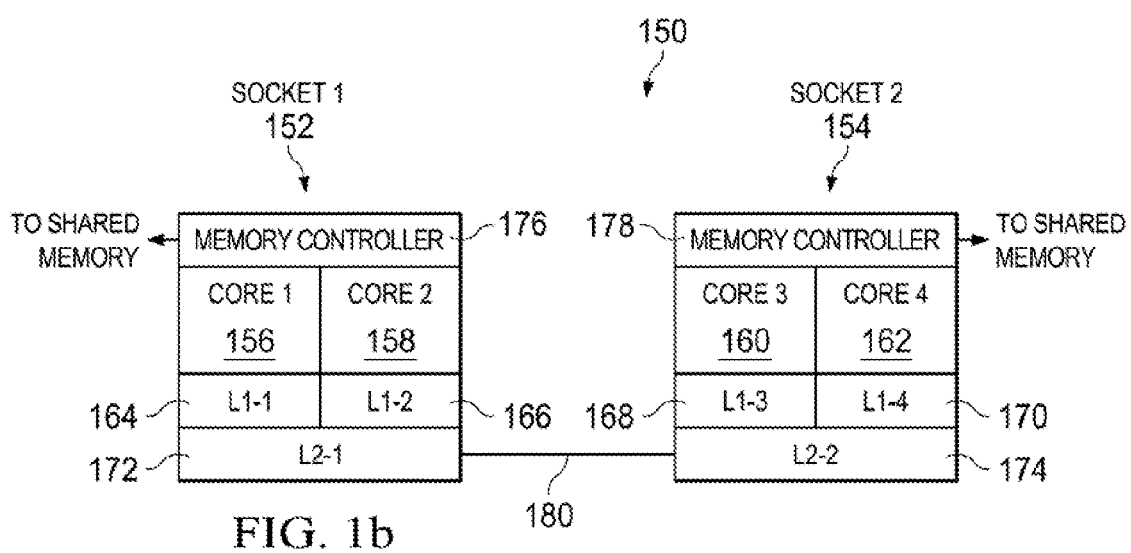

It should be appreciated that the system 100 is one example and that other arrangements of processing units and hardware are within the scope of the present disclosure. For example, FIG. 1b shows an alternate system 150. The system 150 is a two-socket system, with socket 152 containing two processing units (e.g., processing cores) 156, 158 and socket 154 likewise containing two processing units 160, 162. Each processing unit 156, 158, 160, 162 is associated with a dedicated L1 cache 164, 166, 168. 170, and each pair of processing units (i.e., 156, 158 and 160, 162) is associated with an L2 cache 172, 174. Each socket 152, 154 further includes a memory controller 176, 178 that interfaces with a shared memory (not shown). In the present example, a cache coherence protocol such as the MESI protocol is implemented among the L1 caches 164, 166, 168, 170 by way of a coherence bus 180.

Turning now to FIGS. 2a-2i, and referring to the elements of FIGS. 1a and 1b, controlling access to a shared data structure using a multi-lock including a sub-lock for each processing unit that accesses the data structure is explained in further detail. FIGS. 2a-2i refer to four processing units, as shown in FIG. 1b, however this is exemplary and the scope of the present disclosure is intended to address situations where a data structure is shared by as little as two processing units or many more than four processing units.

FIGS, 2a-2i show the contents of the L1 caches 164, 166, 168, 170 of FIG. 1b as well as the logical contents of an exemplary multi-lock 118 as shown in FIG. 1a. The particular multi-lock 118 in the examples of FIGS. 2a-2i includes four sub-locks, one for each processing unit 156, 158, 160, 162 shown in FIG. 1b. Each sub-lock includes a number and a Boolean value, shown as Y or N. The number, which may be a counter in one example, corresponds to the number of readers that have presently acquired the read portion of the sub-lock and the Boolean value indicates whether any processing unit 156, 158, 160, 162 has acquired the write portion of the sub-lock.

The caches 164, 166, 168, 170 have three fields per line: a tag, the cache contents, and a cache protocol state (e.g., a MESI protocol state). Although only shown as having five lines, it will be apparent that an actual cache may have many more lines. In this example, the multi-lock 118 is stored in memory locations 10, 20, 30, and 40, which reside on different cache lines. In FIG. 2a, certain ones of these lines reside in some of the caches 164, 166, 168, 170, having various MESI states. For example, memory location 10 is in the shared or 'S') state in both cache 164 and 166, memory location 20 is in the invalid (or 'I') state in cache 166, memory location 30 is in the exclusive (or 'E') state in cache 168, and memory location 40 is in the modified (or 'M') state in cache 170. Although the tag field in this example may imply a fully-associative cache, this is presented here for simplicity of description: other types of cache (e.g., set-associative) are within the scope of the present disclosure.

Figure 2B:
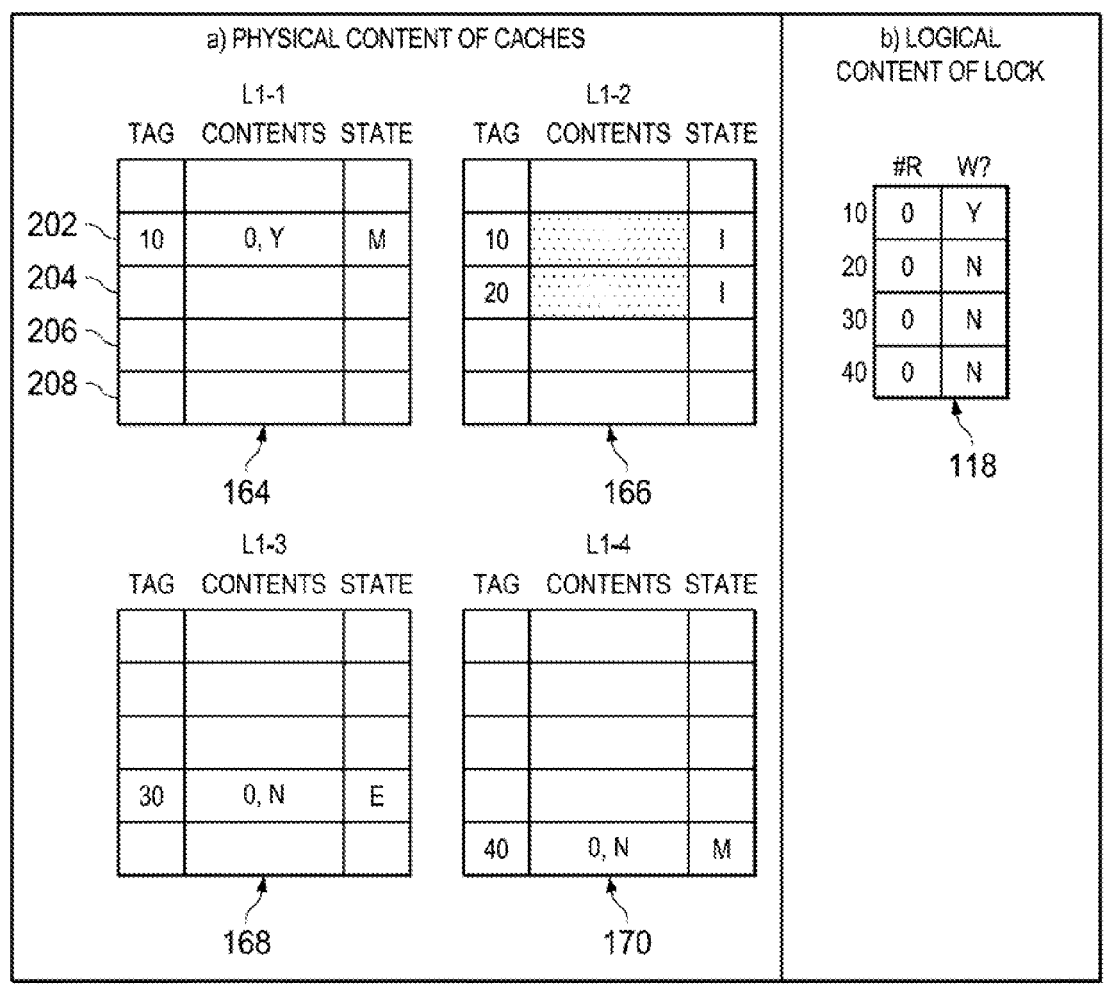

The exemplary contents of cache locations are shown, such as "puppies" or the numeral pi, with various memory locations being in different MESI states. These contents are exemplary and, in FIGS. 2b-2i, details of cache lines that are not relevant to the discussion will be omitted for simplicity. Cache lines in the invalid state are shown as hashes because, although those cache lines do contain data, the data is not relevant according to the MESI protocol. In FIG. 2a, the multi-lock 118 signifies that none of the processing units 156, 158, 160, 162 is reading from or writing to the data structure associated with the multi-lock 118 (i.e., the write portion of all sub-locks contains an 'N' and the read portion counter is zero). Additional reference numerals will be explained in further detail below.

In the example shown in FIG. 2b, the processing unit 156 desires to acquire the write portion of the multi-lock 118 to write to the data structure associated with the multi-lock 118. The processing unit 156 first tests the read portion of its sub-lock to ensure that the counter is at zero (i.e., there are no readers) and sets the write portion to 'Y' to acquire the write portion of the sub-lock. The cache line 202 storing the sub-lock is set to the modified state because the sub-lock has been modified and not written back to a shared memory (e.g., memory 116). Additionally, the processing unit 156 generates coherence traffic to the cache 166 to invalidate its previously-shared copy of memory location 10. However, the processing unit 156 may additionally acquire the write portions of all the other processing units' sub-locks so that those processing units 158, 160, 162 are not able to write to the data structure associated with the multi-lock 118.

Figure 2C:
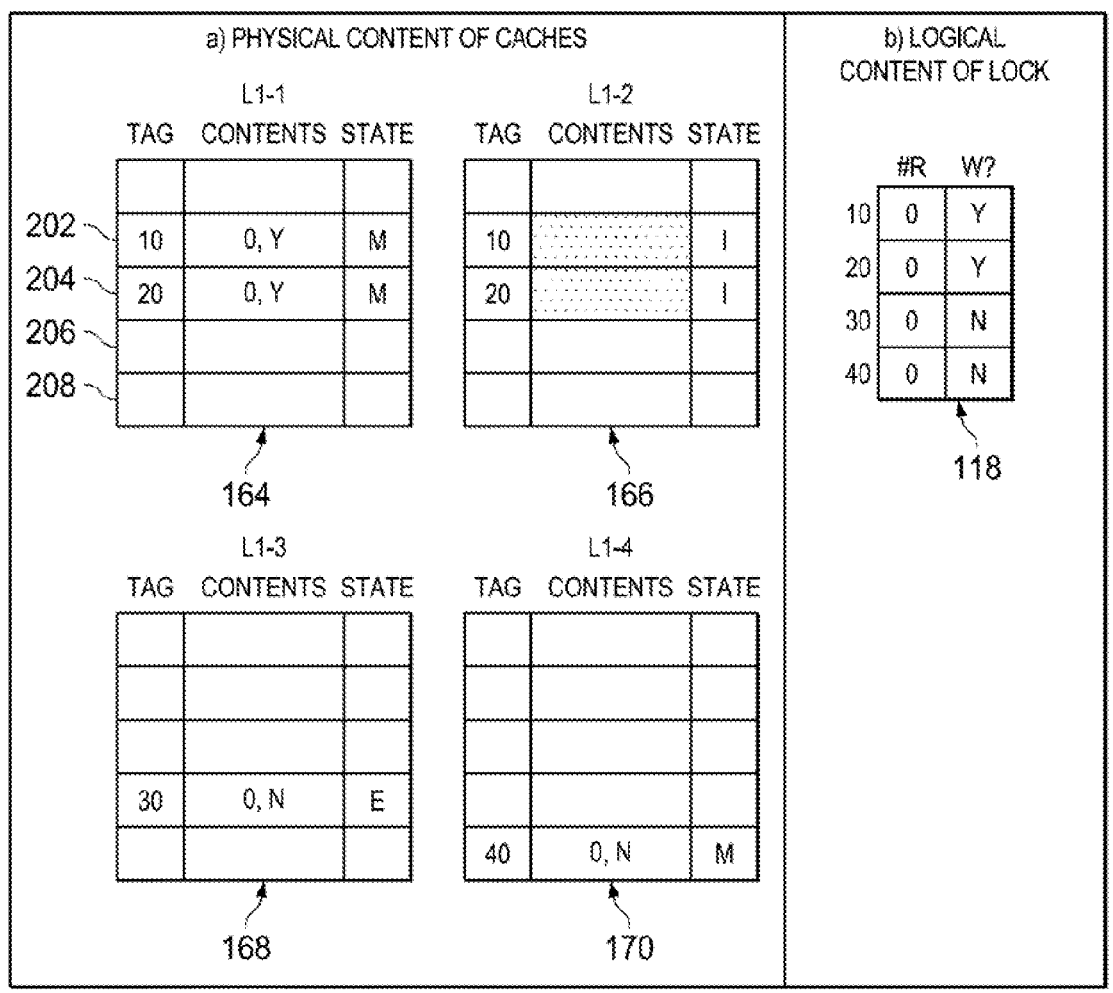

Prior to FIG. 2c, the processing unit 156 does not contain the sub-lock stored at memory location 20 in its cache 164. Thus, in FIG. 2c the processing unit 156 fills cache line 204 with the sub-lock stored at memory location 20 and, since the read portion is not acquired, sets the write portion to 'Y' to acquire the write portion of that sub-lock. Similar to above, the cache line 204 is set to the modified state. Additionally, the processing unit 156 does not contain the sub-lock stored at memory location 30 in its cache 164.

Figure 2D:
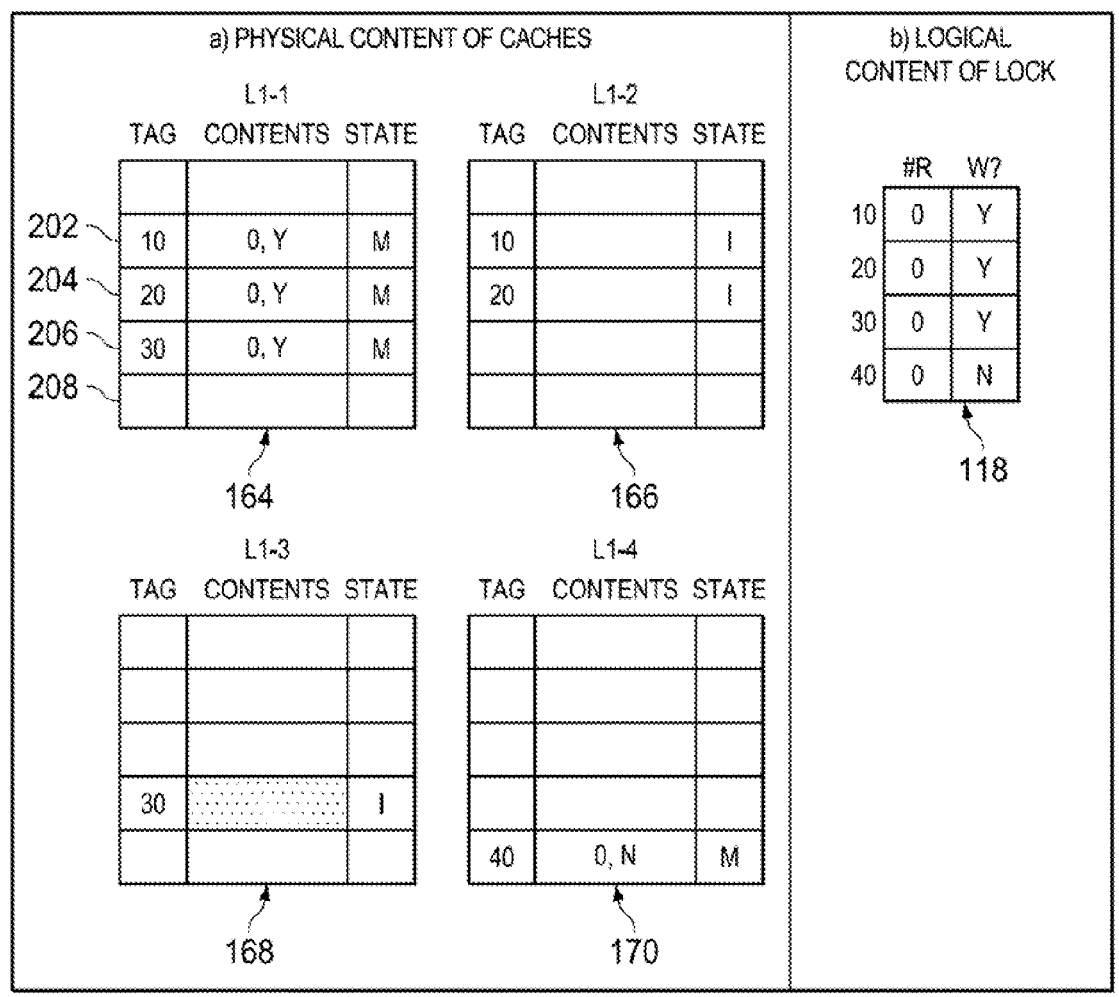
Figure 2E:
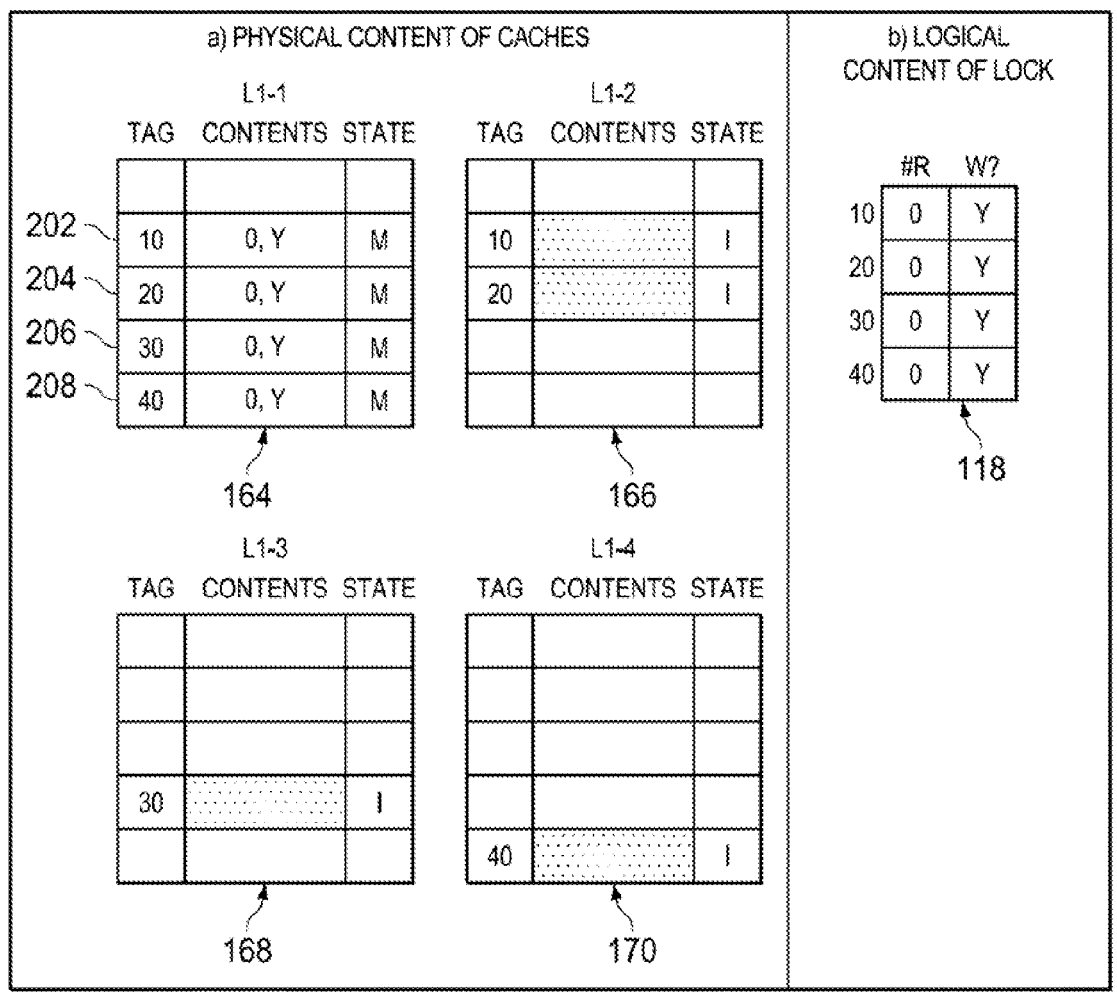

In FIG. 2d, the processing unit 156 fills cache line 206 with the sub-lock stored at memory location 30 and, since the read portion is not acquired, sets the write portion to 'Y' to acquire the write portion of that sub-lock. Additionally, the processing unit 156 generates coherence traffic to the cache 168 to invalidate its copy of memory location 30. FIG. 2e proceeds similarly, except with respect to the sub-lock stored at memory location 40 being loaded to cache line 208. The processing unit 156 generates coherence traffic to the cache 170 to invalidate its copy of memory location 40. Thus, at this point, the processing unit 156 has issued four coherence traffic actions; it has shot down copies of memory locations 10, 30 and 40 and it had to perform a fill for memory location 20 (i.e., bring in memory location 20 from shared memory 116). As a result, the processing unit 156 has acquired the write portion of the multi-lock 118 and may write to the associated data structure, while other processing units 158, 160, 162 are unable to write to the associated data structure because the write portion of each sub-lock is is held by the processing unit 156.

Figure 2F:
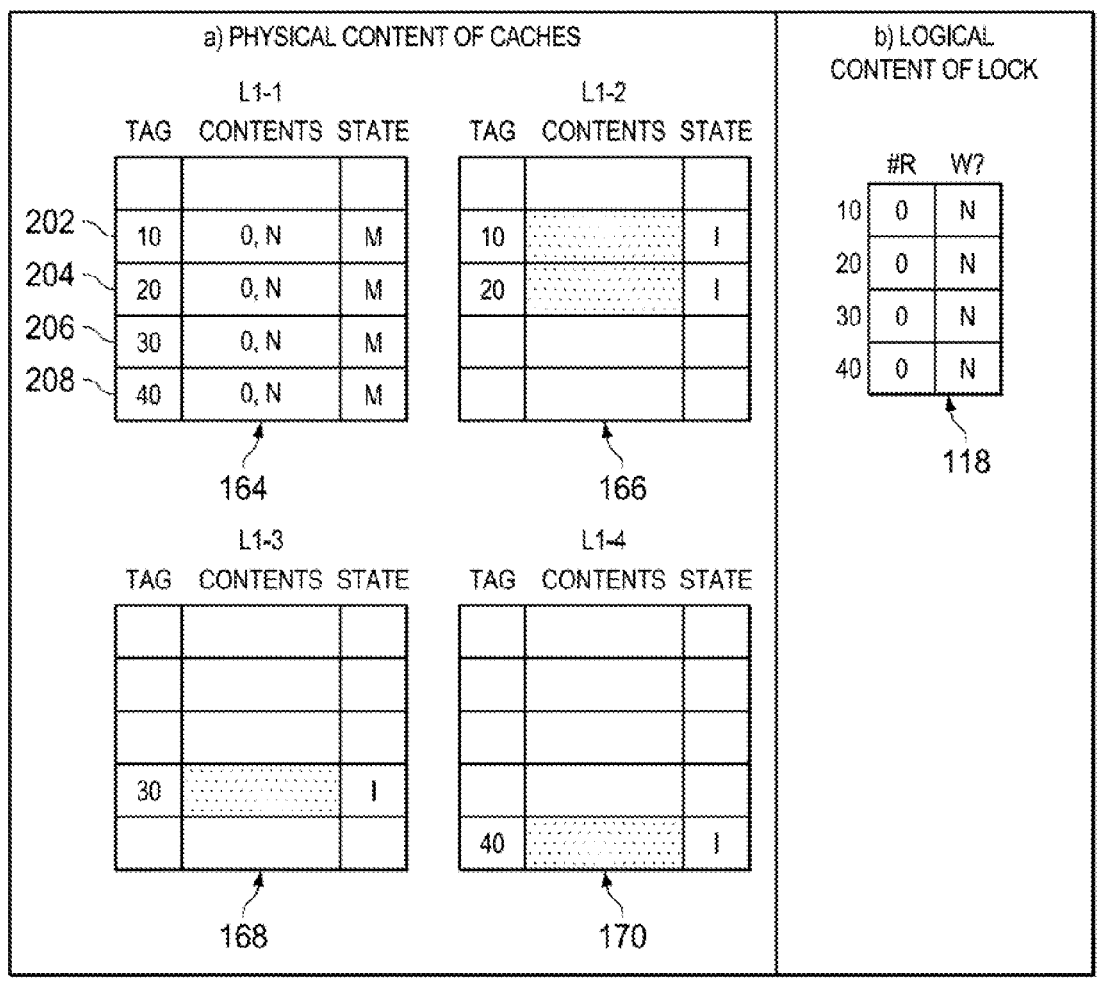

In FIG. 2f, the processing unit 156 releases the write portion of the multi-lock 118 by setting all of the write portions of the sub-locks in cache 164 to 'N.' In some cases, other processing units may be "waiting" to acquire read or write locks, in which case those locks would be acquired after the processing unit 156 releases the write portion of the multi-lock 118. However, in the example case of FIG. 2f, there is no contention or waiting by the other processing units.

Figure 2G:
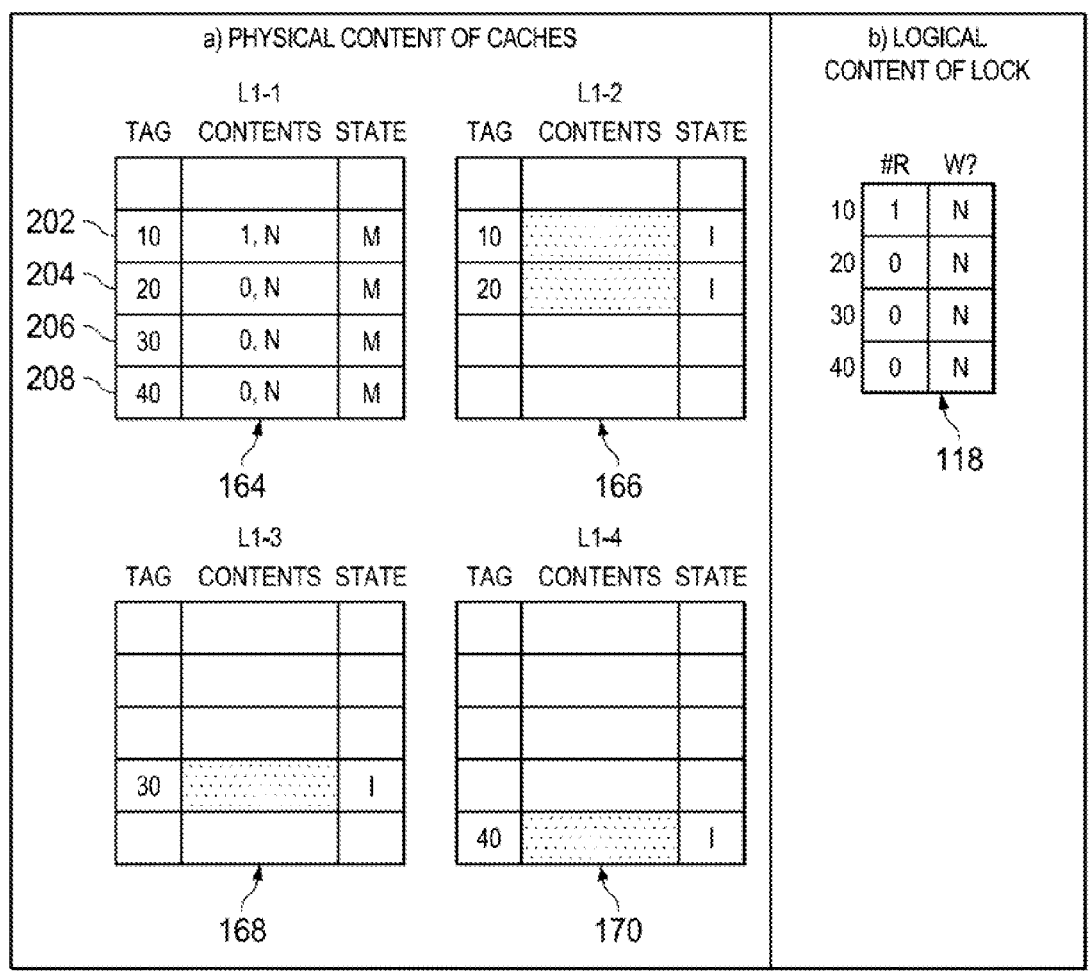

Turning now to FIG. 2g, it is assumed that the processing unit 156 desires to acquire the read portion of the sub-lock stored at memory location 10. This may occur, for example, as a result of a thread executing on the processing unit 156 needing to read from the shared data structure associated with the multi-lock 118. The processing unit 156 determines that its sub-lock is stored at memory location 10. This line is already in cache 164 in the modified state, and thus the processing unit 156 adds 2 to the cache line 202 (i.e., adds 1 to the counter, since in this example the low bit is used as the write portion of the sub-lock). No shootdown (e.g., a notification to other cache units that the copy of a cache line that they hold can no longer be considered up-to-date) or other coherence traffic is generated because the cache line 202 is in the modified state.

Figure 2H:
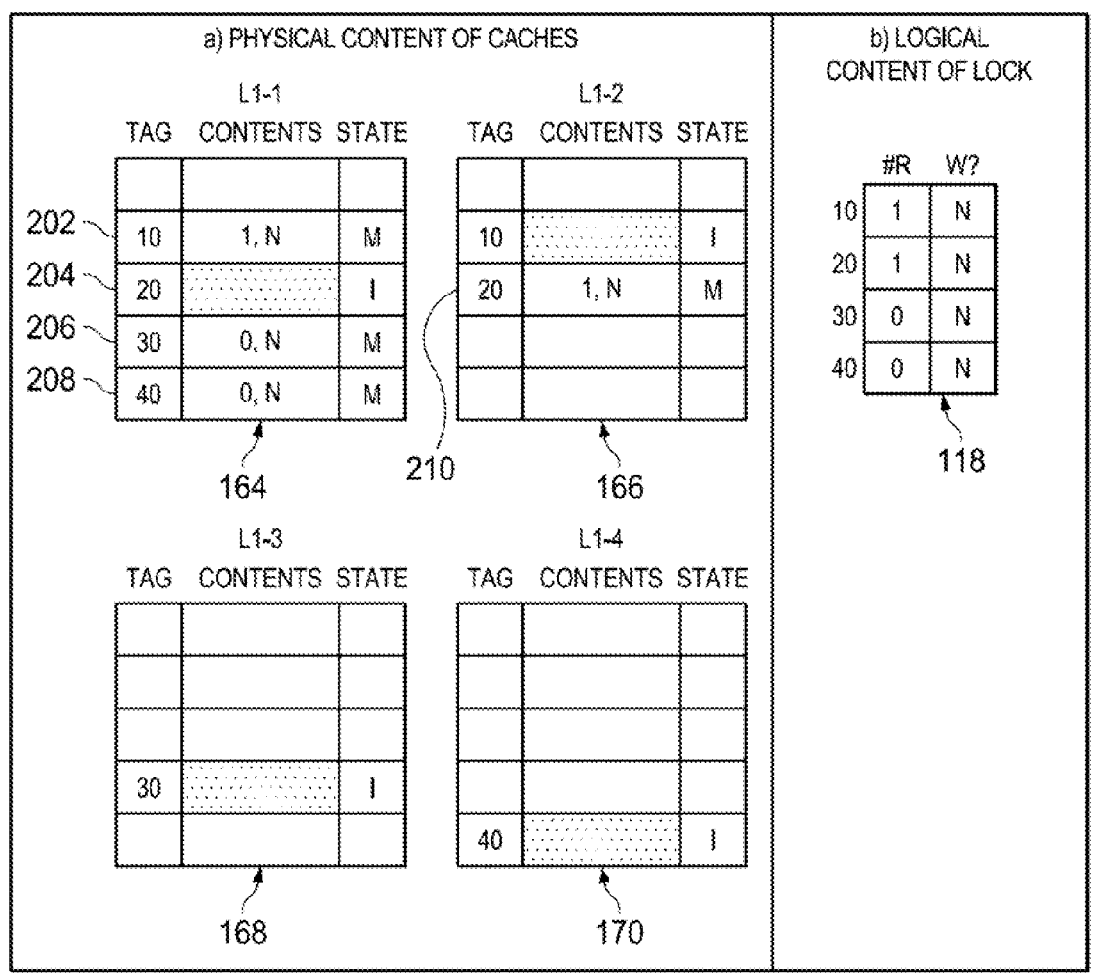

In FIG. 2h, the processing unit 158 desires to acquire the read portion of the sub-lock stored at memory location 20. As above, this may occur as a result of a thread executing on the processing unit 158 needing to read from the shared data structure associated with the multi-lock 118. The processing unit 158 determines that its sub-lock is stored at memory location 20. As shown in FIG. 2f, the cache 166 contains a copy of memory location 20, but that particular cache line 210 was previously in the invalid state, which causes the processing unit 158 to fill the cache line from shared memory 116. Thus, the processing unit 158 generates coherence traffic to shootdown the copy of memory location 20 in cache 164. In some cases, the copies of this cache line may be in the shared state for a transient period as caches 164, 166 both contain copies prior to the copy in cache 164 being shot down. If the caches 164, 166, 168, 170 employed a MERSI protocol rather than the MESI protocol described, the cache line may transiently be in the recent state. After the copy of memory location 20 in cache 164 is shot down, the copy in cache 166 in the modified state, as shown in FIG. 2h. The processing unit 158 has successfully acquired a read lock because the read portion of its sub-lock is incremented and the write portion of its sub-lock is 'N.'

Figure 2I:
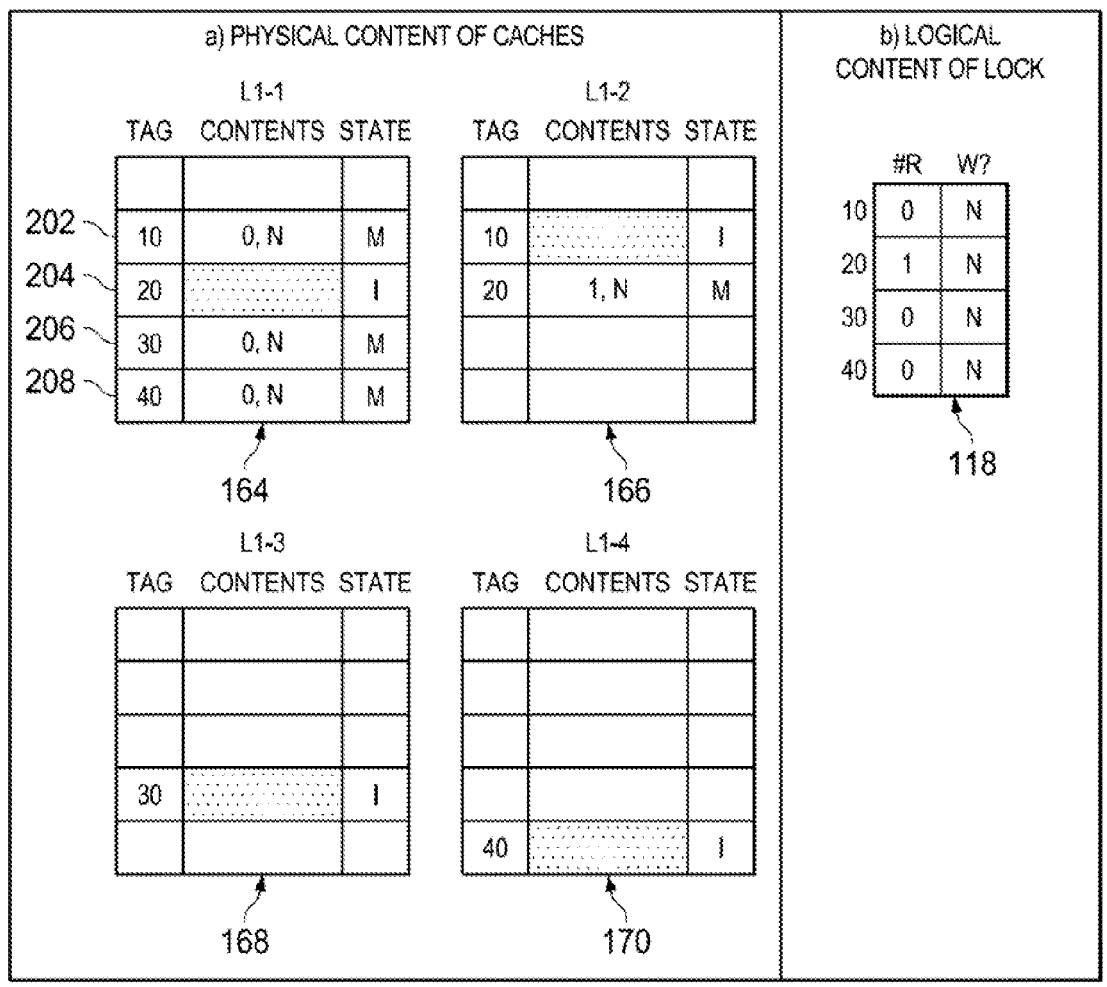

Finally, FIG. 2i shows the result of the processing unit 156 releasing its read lock. Here, rather than add 2 to the copy of memory location 10 on cache line 202, the processing unit 156 subtracts 2. The processing unit 156 does not perform a shootdown or other coherence operation because the cache line 202 is in the modified state.

Thus, in accordance with various examples of the present disclosure, in the absence of an intervening write lock, acquiring a read lock does not require additional coherence traffic. Where no write locks are required, for example, the processing unit 156 will not generate coherence traffic because cache 164 contains the memory location 10 corresponding to the processing unit's 156 sub-lock in the modified state and the read locking procedure does not affect any other processing unit's 158, 160, 162 associated sub-lock. Although write locks typically invalidate other caches, read locks only invalidate a previous writer's cache and need only do so one time, reducing bandwidth costs associated with coherence traffic.

In cases where the MESI protocol is used for cache coherence, the acquisition of a read portion of a sub-lock is not communicated to other processing units if the cache line storing the sub-lock is in the modified or exclusive state (i.e., the copy in cache is privately modifiable). A copy in cache is privately modifiable if the processing unit associated with that cache can modify the copy without needing to communicate the modification to other processing units (e.g., by way of a shootdown). However, as explained above, if the cache line is in the shared state (i.e., in this case, the copy in cache is not privately modifiable because a processing unit other than that associated with the sub-lock stored at that cache line could modify the sub-lock), a shootdown is issued to other caches that contain copies of the memory location and the cache line is updated to the modified state. After the shootdown occurs, additional acquisitions of read locks do not cause coherence traffic because the cache line is now in the modified state.

If the cache line is in the invalid state, the sub-lock is loaded from memory 116 and placed in the modified state and a shootdown is issued to any other processing unit's cache that stores a copy of that sub-lock, causing coherence traffic. Similar to above, additional read operations do not cause coherence traffic because the cache line containing the sub-lock is in the modified state. The number of times a processing unit attempts to acquire a read lock where the cache line containing its sub-lock is in the modified or exclusive state, where no coherence traffic is generated, typically greatly outnumbers the instances in which the cache line containing its sub-lock is in the shared or invalid state. This is often true because a processing unit may read from the same data structure a large number of times without an intervening write by it or another processing unit. Furthermore, the moderate increase in coherence traffic caused by acquiring a write lock (e.g., because the write portion of all sub-locks must be acquired) is also outweighed by the lack of coherence traffic when acquiring a read lock where the cache line containing a sub-lock is in the modified or exclusive state.

Referring back to FIG. 1a, the data access control engines 106, 108 are combinations of programming and hardware to execute the programming. Although shown as single pieces of software programming, the data access control engines 106, 108 may comprise multiple pieces of software programming that are executed in a collaborative manner. For example, referring to the data access control engine 106, the data access control engine 106 determines whether a privately modifiable copy of its processing unit's 102 associated sub-lock exists in the associated cache 110. For example, a privately modifiable copy of a sub-lock may be stored on a cache line in the modified or exclusive states. If a privately modifiable copy of the sub-lock exists, the data access control engine 106 acquires the read portion of the sub-lock and does not communicate the acquisition across the coherence bus 114, since the acquisition of a read lock does not affect any other processing unit's associated sub-lock. Thus, no coherence traffic is generated. However, if a privately modifiable copy of the sub-lock does not exist, the data access control engine loads the appropriate sub-lock into the cache 110 from shared memory 116 and acquires the read portion of that sub-lock.

Figure 3:
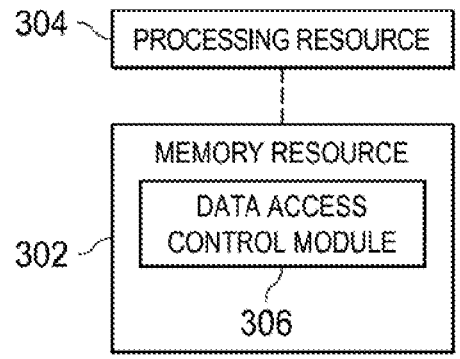
FIG. 3 shows data access control system in accordance with various examples of the present disclosure.

Referring now to FIG. 3, a data access control system 300 is shown in accordance with various examples of the present disclosure. The data access control system 300 includes a memory resource 302 coupled to a processing resource 304. The processing resource 304 is one or more local or distributed processors. The memory resource 302 includes one or more local or distributed memory devices and comprises a data access control module 306. Thus, the memory resource 302 and the processing resource 304 are hardware components of the system 300.

The data access control module 306 represents instructions that, when executed by the processing resource 304, implements an associated engine. For example, when the data access control module 306 is executed by the processing resource 304, the above-described data access control engine 106 functionality is implemented. The data access control module 306 may also be implemented as an installation package or packages stored on the memory resource 302, which may be a CD/DVD or a server from which the installation package may be downloaded.

Figure 4:
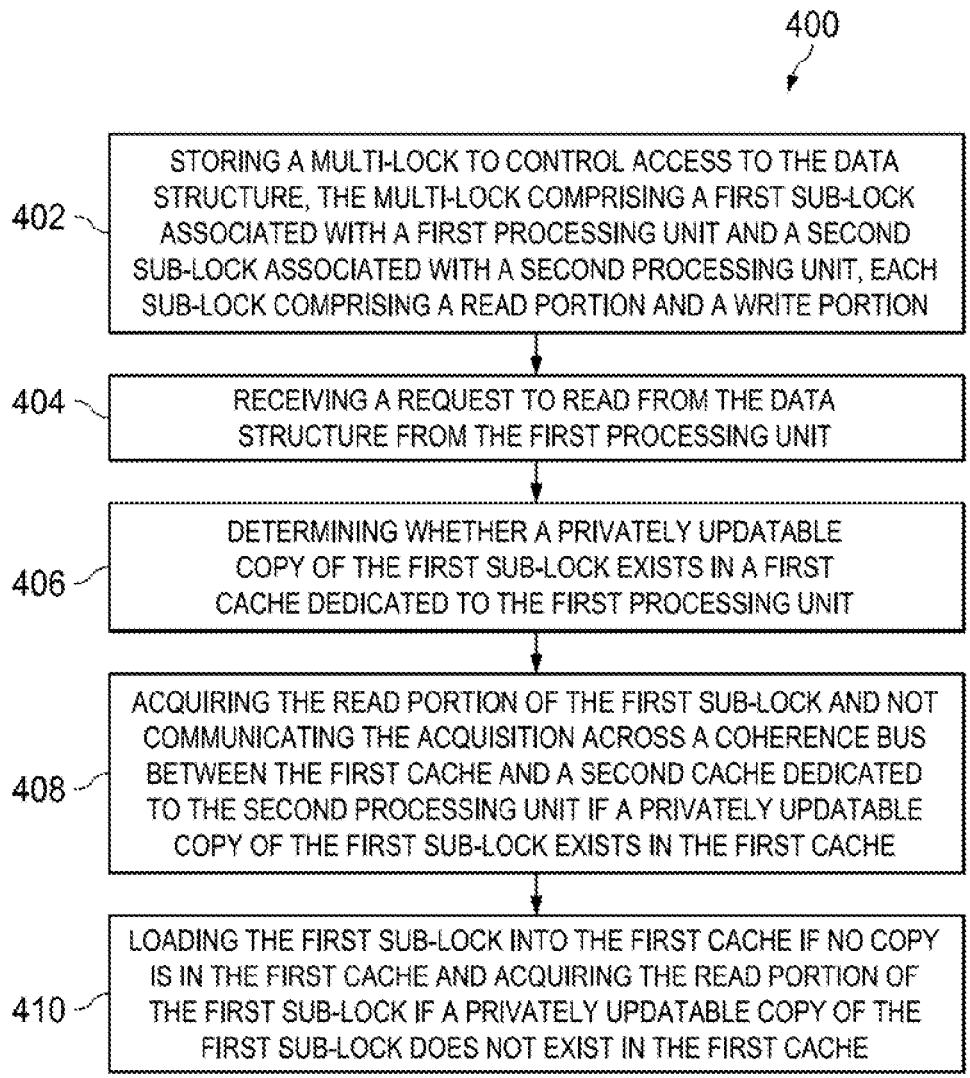
FIG. 4 shows a flow chart of a method for controlling access to a shared data structure in accordance with various examples of the present disclosure.

FIG. 4 shows a method 400 for controlling access to a shared data structure in accordance with various examples of the present disclosure. The method 400 begins in block 402 with storing a multi-lock to control access to the shared data structure. The multi-lock includes a first sub-lock 120 associated with a first processing unit 102 and a second sub-lock 122 associated with a second processing unit 104. Each of the sub-locks 120, 122 has a read portion and a write portion. The method 400 continues in block 404 with receiving a request to read from the data structure from the first processing unit 102. The method 400 then continues in block 406 with determining whether a privately modifiable copy of the first sub-lock 120 exists in a first cache 110 dedicated to the first processing unit 102. As explained above, a privately modifiable copy may exist where the cache line storing a copy of the first sub-lock 120 is in the modified or exclusive state.

The method continues in block 408 with acquiring the read portion of the first sub-lock 120 (e.g., by incrementing a counter that corresponds to the read portion) and not communicating the acquisition across a coherence bus 114 between the first cache 110 and a second cache 112 dedicated to the second processing unit 104 if a privately modifiable copy of the first sub-lock 120 exists in the first cache 110. Thus, no coherence traffic is generated across the coherence bus 114 where a processing unit acquires the read portion of a sub-lock stored on a privately modifiable cache line (e.g., a cache line in the modified or exclusive state). The method 400 further continues in block 410 with loading the first sub-lock 120 into the first cache 110 if no copy is in the first cache 110 and acquiring the read portion of the first sub-lock 120 if a privately modifiable copy of the first sub-lock 120 does not exist in the first cache 110 (e.g., if the cache line storing the copy of the first sub-lock 120 is in the shared or invalid state or there is no cache line that stores a copy of the first sub-lock 120). In cases where the first sub-lock 120 is in the shared state, it may not be necessary to load a copy of the first sub-lock 120 to the first cache 110, while in other cases where the first sub-lock 120 is in the invalid state, a copy of the first sub-lock 120 may be loaded from the shared memory 116. In some cases, coherence traffic may be involved, for example to issue a shootdown to another processing unit's cache that stores a privately modifiable copy of the acquired sub-lock 120.

As explained above, the number of times a processing unit attempts to acquire a read lock where the cache line containing its sub-lock is in the modified or exclusive state, where no coherence traffic is generated, is typically greater than the instances in which the cache line containing its sub-lock is in the shared or invalid state. This is often true because a processing unit may read from the same data structure a large number of times without an intervening write by it or another processing unit. Furthermore, the moderate increase in coherence traffic caused by acquiring a write lock (e.g., because the write portion of all sub-locks must be acquired) is also outweighed by the reduction in coherence traffic when acquiring a read lock where the cache line containing a sub-lock is in the modified or exclusive state.

In some examples of the present disclosure, particularly where the MESI cache coherence protocol is employed, each processing unit's sub-lock should be stored on different cache lines. This is because MESI coherence scheme is cache line based, and thus storing sub-locks for multiple processing units on a single cache line would result in confusion as to the state (e.g., M, E, S, or I) of a single sub-lock. Different packing methods may be employed to store one processing unit's sub-locks on a single cache line, which may vary based on the size of the sub-locks. Additionally, where a different cache coherence protocol is employed, it may not be necessary to restrict a cache line to contain only sub-locks belonging to one processing unit.

Figure 5:
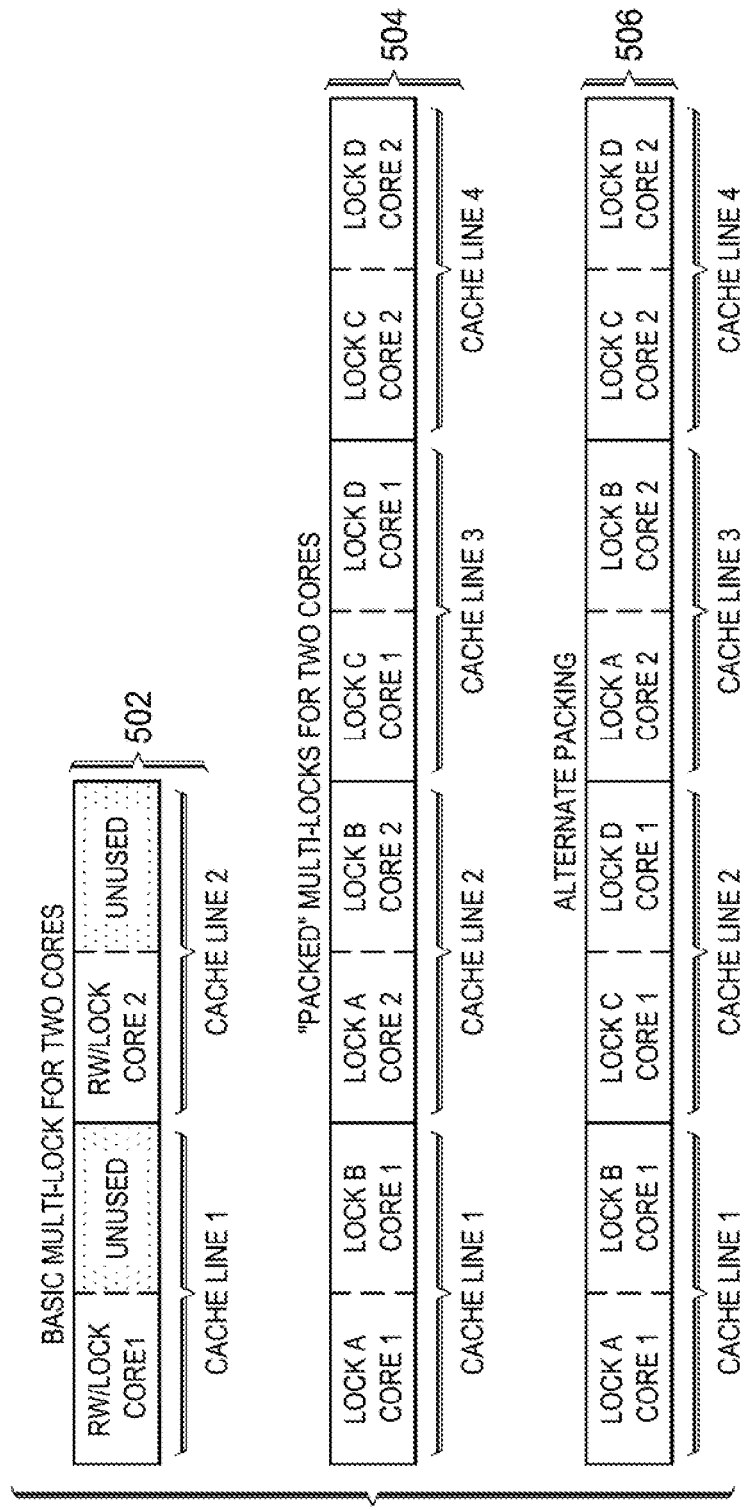
FIG. 5 shows exemplary sub-lock packing schemes in accordance with certain examples of the present disclosure.

FIG. 5 shows exemplary sub-lock packing schemes in accordance with certain examples of the present disclosure. As explained above, it may be advantageous to ensure that not more than one processing unit stores a sub-lock on a single cache line. The top example 502 shows two cache lines, each storing a read/write lock for one processing unit and having a portion of unused space. This is a simple example where the size of the read/write lock is less than the size of a cache line, The next example 504 shows successive cache lines, where every other cache line stores multiple locks for one of two processing units. The first cache line stores two different locks for core 1, the second cache line stores two different locks for core 2, the third cache line stores two different locks for core 1, and so on. The bottom example 506 shows a variation of example 504, but where every second cache line stores two different locks for one of two processing units. The first and second cache lines store different locks for core 1, the third and fourth cache lines store different locks for core 2, and so on. The above are merely exemplary, and many different sub-lock packing schemes are within the scope of the present disclosure.

The above discussion is meant to be illustrative of the principles and various examples of the present invention. Numerous variations and modifications will become apparent to those skilled in the art once the above disclosure is fully appreciated. For example, although described generally with respect to the MESI cache coherence protocol, also known as the "Illinois protocol," the above disclosure may be adapted to a number of other cache coherence protocols. Some examples may employ the simpler "MSI" protocol, or the related MOSI, MOESI, MERSI, and MESIF protocols (as an example of other related protocols). In some cases, the "M or E" states may refer to those states in which a cache-coherence protocol may modify a cache line without notifying other protocol participants; in one example, the "R" state of the MERSI protocol can be considered similar to modified or E. Similarly, the F state of the MESIF protocol can be considered similar to the shared state in that it requires notification to other participants, which is all that matters for the purposes of the below discussion.

As another example, acquiring a read lock has been generally described as incrementing a counter, however acquiring a read lock may be implemented in many ways (e.g., using operations such as fetch and add, compare and swap, test and set, compare and "OP", fetch and OP, atomic predicate-and-op, futex operations, using data structures such as turn and ticket counters, bitsets, lists of waiting threads) to signal to other processing units that a particular processing unit is currently reading from a shared data structure. Further, the reader/write lock has been described as embodying the read and write sub-portions within the same memory word using a counter and single bit respectively, although alternate implementations (e.g., two counters, bit operations, multiple words, lists) are possible. It is intended that the following claims be interpreted to embrace all such variations and modifications.

What is claimed is:

1. A computer system for controlling access to a shared data structure, comprising:
   a first processing unit coupled to a first cache dedicated to the first processing unit;
   a second processing unit coupled to a second cache dedicated to the second processing unit;
   a shared memory coupled to the first and second processing units that stores a multi-lock to control access to a data structure shared by the first and second processing units, the multi-lock comprising a first sub-lock associated with the first processing unit and a second sub-lock associated with the second processing unit, the sub-locks comprising a read portion and a write portion;
   a coherence bus that couples the first and second caches and carries coherency information between the first and second caches; and
   a data access control engine to receive a request to read from the data structure from the first processing unit and, as a result:
      determine whether a privately modifiable copy the first sub-lock exists in the first cache;
      acquire the read portion of the first sub-lock and not communicate the acquisition across the coherence bus if a privately modifiable copy of the first sub-lock exists in the first cache: and
      if a privately modifiable copy of the first sub-lock does not exist in the first cache, load the first sub-lock into the first cache if no copy is in the first cache, shootdown other copies of the first sub-lock, and acquire the read portion of the first sub-lock.

2. The computer system of claim 1 wherein the coherence bus carries coherency information that implements a MESI cache coherence protocol.

3. The computer system of claim 2 wherein a copy of the first sub-lock is privately modifiable if a cache line that stores the first sub-lock in the first cache is in a modified or exclusive state.

4. The computer system of claim 2 wherein a copy of the first sub-lock is not privately modifiable if a cache line that stores the first sub-lock in the first cache is in a shared or invalid state or there is no cache line that stores the first sub-lock in the first cache, and wherein if the cache line that stores the first sub-lock in the first cache is in the shared state, a shootdown is issued to the second cache over the coherence bus and the read portion of the first sub-lock is acquired.

5. The computer system of claim 2 wherein the data access control engine is further configured to receive a request to write to the shared data structure from the first processing unit and, as a result, for each sub-lock of the multi-lock:
   acquire the write portion of the sub-lock if the read portion indicates there are no processing units that have acquired the read portion of the sub-lock and a cache line storing the sub-lock in the first cache is in a modified or exclusive state;
   acquire the write portion of the sub-lock and issue a shootdown to caches other than the first cache if the read portion indicates that there are no processing units that have acquired the read portion of the sub-lock and a cache line storing the sub-lock in the first cache is in a shared state; and
   if a privately modifiable copy of the sub-lock does not exist in the first cache, load the sub-lock into the first cache if no copy is in the first cache, acquire the write portion of the sub-lock, and issue a shootdown to caches other than the first cache if the read portion indicates that there are no processing units that have acquired the read portion of the sub-lock.

6. The computer system of claim 1 wherein a shootdown is issued to the second cache over the coherence bus when the first sub-lock is loaded into the first cache from the shared memory.

7. A method for controlling access to a shared data structure, comprising:
   storing a multi-lock to control access to the data structure, the multi-lock comprising a first sub-lock associated with a first processing unit and a second sub-lock associated with a second processing unit, each sub-lock comprising a read portion and a write portion;
   receiving a request to read from the data structure from the first processing unit;

determining whether a privately modifiable copy of the first sub-lock exists in a first cache dedicated to the first processing unit;

acquiring the read portion of the first sub-lock and not communicating the acquisition across a coherence bus between the first cache and a second cache dedicated to the second processing unit if a privately modifiable copy of the first sub-lock exists in the first cache; and loading the first sub-lock into the first cache if no copy is in the first cache and acquiring the read portion of the first sub-lock if a privately modifiable copy of the first sub-lock does not exist in the first cache.

8. The method of claim 7 wherein the coherence bus carries coherency information that implements a MESI cache coherence protocol.

9. The method of claim 8 wherein a copy of the first sub-lock is privately modifiable if a cache line that stores the first sub-lock in the first cache is in a modified or exclusive state.

10. The method of claim 8 wherein a copy of the first sub-lock is not privately modifiable if a cache line that stores the first sub-lock in the first cache is in a shared or invalid state or there is no cache line that stores the first sub-lock in the first cache, and wherein if the cache line that stores the first sub-lock in the first cache is in the shared state, the method further comprises issuing a shootdown to the second cache over the coherence bus and acquiring the read portion of the first sub-lock.

11. The method of claim 8 further comprising receiving a request to write to the data structure from the first processing unit and, as a result, for each sub-lock of the multi-lock:

acquiring the write portion of the sub-lock if the read portion indicates there are no processing units that have acquired the read portion of the sub-lock and a cache line storing the sub-lock in the first cache is in a modified or exclusive state;

acquiring the write portion of the sub-lock and issuing a shootdown to caches other than the first cache if the read portion indicates that there are no processing units that have acquired the read portion of the sub-lock and a cache line storing the sub-lock in the first cache is in a shared state; and if a privately modifiable copy of the sub-lock does not exist in the first cache, loading the sub-lock into the first cache if no copy is in the first cache, acquiring the write portion of the sub-lock, and issuing a shootdown to caches other than the first cache if the read portion indicates that there are no processing units that have acquired the read portion of the sub-lock.

12. The method of claim 7 further comprising issuing a shootdown to the second cache over the coherence bus when the first sub-lock is loaded into the first cache from the shared memory.

13. A non-transitory computer-readable storage device storing software that, when executed by a processor including a coherence bus, causes the processor to:

store a multi-lock to control access to a data structure, the multi-lock comprising a first sub-lock associated with a first processing unit and a second sub-lock associated with a second processing unit, each sub-lock comprising a read portion and a write portion:

receive a request to read from the data structure from the first processing unit;

determine whether a privately modifiable copy of the first sub-lock exists in a first cache dedicated to the first processing unit;

acquire the read portion of the first sub-lock and not communicate the acquisition to a second cache dedicated to the second processing unit if a privately modifiable copy of the first sub-lock exists in the first cache; and load the first sub-lock into the first cache if no copy is in the first cache and acquire the read portion of the first sub-lock if a privately modifiable copy of the first sub-lock does not exist in the first cache.

14. The non-transitory computer-readable storage device of claim 13 wherein the coherence bus carries coherency information that implements a MESI cache coherence protocol.

15. The non-transitory computer-readable storage device of claim 14 wherein the processor receives a request to write to the data structure from the first processing unit and, as a result, for each sub-lock of the multi-lock:

acquires the write portion of the sub-lock if the read portion indicates there are no processing units that have acquired the read portion of the sub-lock and a cache line storing the sub-lock in the first cache is in a modified or exclusive state;

acquires the write portion of the sub-lock and issues a shootdown to caches other than the first cache if the read portion indicates that there are no processing units that have acquired the read portion of the sub-lock and a cache line storing the sub-lock in the first cache is in a shared state; and if a privately modifiable copy of the sub-lock does not exist in the first cache, loads the sub-lock into the first cache if no copy is in the first cache, acquires the write portion of the sub-lock, and issues a shootdown to caches other than the first cache if the read portion indicates that there are no processing units that have acquired the read portion of the sub-lock.

* * * * *